(12) United States Patent
Delfosse et al.

(10) Patent No.: US 8,697,182 B2
(45) Date of Patent: Apr. 15, 2014

(54) SYNTHETIC BINDER ESSENTIALLY MADE OF MATERIALS FROM RENEWABLE RESOURCES, IN PARTICULAR OF VEGETABLE ORIGIN, AND APPLICATIONS THEREOF IN ROAD ENGINEERING

(75) Inventors: Frederic Delfosse, Pessac (FR); Matthieu Chatillon, Compiegne (FR); Daniel Prud'Homme, Chevincourt (FR)

(73) Assignees: Eurovia, Rueil-Malmaison (FR); Novance, Venette (FR)

( * ) Notice: Subject to any disclaimer, the term of this patent is extended or adjusted under 35 U.S.C. 154(b) by 0 days.

(21) Appl. No.: 13/575,401

(22) PCT Filed: Jan. 28, 2011

(86) PCT No.: PCT/EP2011/051219
§ 371 (c)(1),
(2), (4) Date: Jul. 26, 2012

(87) PCT Pub. No.: WO2011/092288
PCT Pub. Date: Aug. 4, 2011

(65) Prior Publication Data
US 2012/0302672 A1    Nov. 29, 2012

(30) Foreign Application Priority Data
Jan. 28, 2010 (FR) ................................ 10 50567

(51) Int. Cl.
*E01C 7/30* (2006.01)
(52) U.S. Cl.
USPC .......................................... 427/136; 428/543
(58) Field of Classification Search
USPC .......................................... 427/136; 428/543
See application file for complete search history.

(56) References Cited

U.S. PATENT DOCUMENTS

| 2,195,536 A | 4/1940 | Laughlin et al. |
| 5,021,476 A | 6/1991 | Pinomaa |
| 7,670,420 B2 | 3/2010 | Ballie |
| 2012/0016171 A1 | 1/2012 | Kustov et al. |

FOREIGN PATENT DOCUMENTS

| EP | 0 256 467 A2 | 2/1988 |
| FR | 2134926 | 11/1972 |
| FR | 2853647 A1 | 10/2004 |
| FR | 2915204 A1 | 10/2008 |
| WO | WO-2007/051302 A1 | 5/2007 |

OTHER PUBLICATIONS

Brosseaud et al. "Bilan D'Utilisation des Revetements Bitumineux Colores en France," 3rd Eurasphalt & Eurobitume Congress Vienna 2004, Paper 289. (English Abstract attached).
NF P18-602, NF EN 13043, "Granulats pour les melanges hydrocarbobnes et pour les enduits superficiels utilises dans la construction des chausses, aerodromes et d'autres zones de circulation," Aug. 2003.
NF T65-001, NF EN 12591, "Specifications for paving grade bitumens," Dec. 2009.
Rapport de Recherche Internationale (French Search Report) for application No. PCT/EP2011/051219, dated Jun. 9, 2011.

*Primary Examiner* — Peter Szekely
(74) *Attorney, Agent, or Firm* — Foley & Lardner LLP

(57) ABSTRACT

The invention relates to a synthetic binder characterized in that said binder includes: from 20 wt % to 100 wt % of at least one polyester based essentially on material from renewable resources, in particular of vegetable origin, having: a hydroxyl number below 100 mg KOH/g, an acid number below 25 mg KOH/g, an iodine number below 100 g $I_2$/100 g, and from 0 wt % to 80 wt % of at least one natural or modified resin from renewable resources, in particular of vegetable origin.

36 Claims, 1 Drawing Sheet

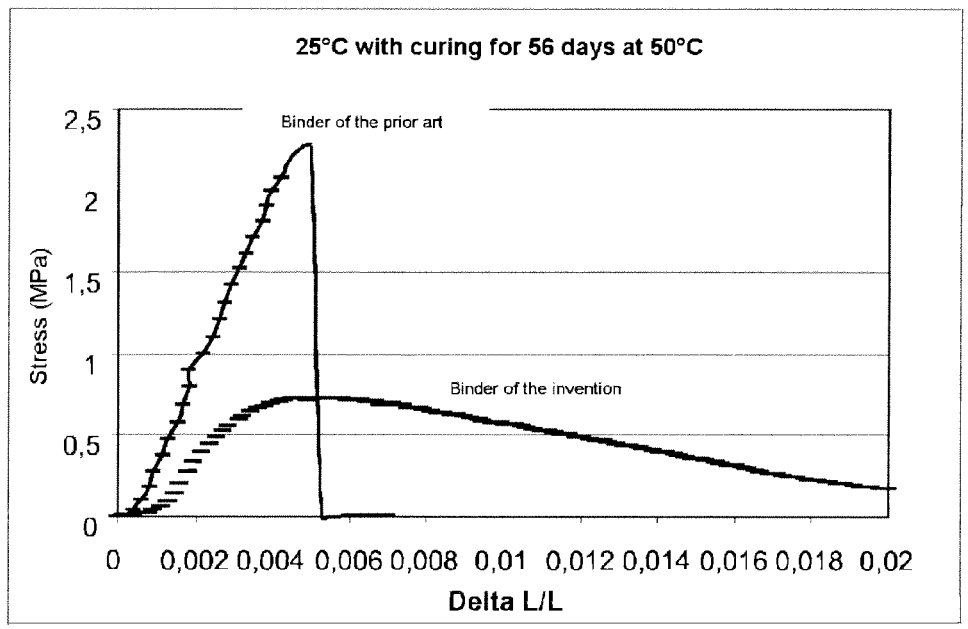

SYNTHETIC BINDER ESSENTIALLY MADE OF MATERIALS FROM RENEWABLE RESOURCES, IN PARTICULAR OF VEGETABLE ORIGIN, AND APPLICATIONS THEREOF IN ROAD ENGINEERING

The invention relates to the formulation of a synthetic binder essentially made of material from renewable resources, in particular of vegetable origin.

Generally, the expression "material from renewable resources" refers to natural renewable material whose stock can be replenished over a short period on a human scale. In particular, said material is raw material of animal or vegetable origin.

Said binder can be pigmented and used in civil engineering to replace bituminous binders and/or synthetic binders of petrochemical origin.

Bituminous hinders are used notably in the fields of road construction, roofing materials, coatings and sealants.

One of the principal applications of asphalt concrete, also called asphalt mix, is mixtures comprising a bituminous binder and aggregate, said mixtures being commonly used in the construction of road courses or in sealing work. Said road courses may be sub-grade courses or wearing courses.

Herein, the term "wearing course" refers to the surface layer of a roadway. The person skilled in the art will recognize the various formulas of bituminous mix, generally standardized, such as semi-coarse asphaltic concrete, thin asphalt concrete, very thin asphalt concrete, ultra-thin asphalt concrete, porous asphalt, airfield asphaltic concrete, chipped asphaltic concrete, flexible asphaltic concrete, cold-micro asphalt concrete surfacing, slurry surfacing, dense-graded cold-mix asphalt, open-graded cold-mix asphalt and cold asphaltic concrete. The term further refers to formulas for wearing courses used in other countries and easily recognizable by the person skilled in the art, as well as to formulas for asphalt mix used provisionally as a wearing course, for example while awaiting construction of the final wearing course.

Herein, the term "aggregates" refers to aggregates of various origins, including aggregates from quarries or gravel pits, recycling products such as aggregates from the milling of old asphalt mix, manufacturing scraps, recycled building materials (demolition concrete, etc.), slag, schist, artificial aggregates of any origin, for example clinkers from the incineration of household waste, as well as mixtures thereof in any proportions. Specifications for said materials are described in standard NF EN 13-043 bearing on "Aggregates for hydrocarbon mixtures and for surface dressings used in the construction of roads, airfields and other traffic zones". Said standard also defines fines, also called mineral fines, dust or fillers, which are mineral particles that pass through a 63 µm mesh. A typical granular mixture for asphalt concrete contains fillers in a proportion between roughly 3% and 15% by weight, which can be those naturally present in the aggregate after its manufacture and/or can be added, in which case coming from the same aggregate or another aggregate. It is thus common to add limestone filler. Less commonly, fillers come from other sources such as cement or lime.

Another important application for bituminous binders are surface dressings, as described in the technical guide titled "Surface dressings" published by the SETRA (the Technical Department for Transport, Roads and Bridges Engineering and Road Safety of the French Ministry of Ecology, Sustainable Development, Transport and Housing) and the LCPC (France's Central Laboratory of Roads and Bridges) in May 1995.

Said bituminous binders are generally natural bitumen from crude oil, oil shale, heavy oil, bituminous sand, etc., obtained notably by distillation and de-asphalting of the heavy fraction from distillation.

Said bituminous binders can be used just as-is or can be fluxed with one or more fluxe(s) or thinner(s) arising from, for example, organic chemistry or petrochemistry, or of vegetable origin, or can be used in the form of an emulsion or foam.

The person skilled in the art knows that numerous additives can be added to the asphalt mix, dressing or binder, such as fluxes or emulsifiers, so as to regulate their properties. For example, and in a nonrestrictive manner, it is possible to add additives such as zeolites, waxes and natural or synthetic fibers to improve workability, and/or agents that promote binder-aggregate adhesion, and/or polymers (optionally salvaged polymers such as cable waste or fine rubber powder, etc.) and/or additives aimed at regulating rupture of the emulsion, and/or the additives aimed at regulating the formation of foam.

However, such bituminous binders have a major disadvantage when they are used in road construction: their color, invariably black, is hard to change.

Colored coatings improve driver safety by clearly identifying specific routes (pedestrian walkways, bike lanes, bus lanes, etc.) and by marking certain danger zones (entering city limits, dangerous curves, etc.).

Furthermore, said colored coatings improve the living environment in terms of esthetics which they bring to improvement projects (esplanades, squares, etc.), the possible colors being limited by the choices and quantities of pigments available commercially and their return in the presence of other components of the asphalt mix, notably aggregates.

Said colored coatings also improve visibility in low-light conditions, for example at night or in particular sites such as tunnels. At tunnel entrances, they also decrease visual contrast ("black hole" effect), improving driver comfort. Moreover, these clear coatings reflect more light and thus reduce lighting costs while providing the same overall level of light.

Coatings that are even more reflective also decrease the surface temperatures, thus fighting effectively against rutting phenomena resulting from excessive fluidization of the binder following a significant increase in temperature. Studies carried out on the outskirts of Paris reported by Y. Brosseaud and M. Saint-Jacques in the article "Assessment of the use of colored bituminous coatings in France" published in the proceedings of the $3^{rd}$ Eurasphalt & Eurobitume Congress, Vienna (Austria), May 12-14, 2004, vol. 1, pp. 43-53, note a 5° C. decrease in the surface temperature of a clear binder coating compared to a traditional asphalt mix, under conditions of summer heat with outside temperatures of 34° C.

Colored coatings cannot be manufactured with traditional bituminous binders. There are methods, for example that described in U.S. Pat. No. 2,195,536, for chemically treating a bituminous binder to decrease its asphaltene content, asphaltenes being polycondensed aromatic compounds of bitumen that greatly contribute to its black color. However, with this approach it is not possible to control color over a wide range and only red pigments can be used, to systematically give asphalt a brown or burgundy color.

Synthetic binders, also called clear or pigmentable binders or synthetic, clear or pigmentable bitumens, have thus been developed. Said synthetic binders make it possible to change the binder's color with ease. To that end, it is thus necessary to have available a clear base, the synthetic hinder, white, yellow or light beige in color, to which it is then possible to add any type of aggregate and/or pigment of organic or mineral nature, in order to obtain the desired color. These optionally pigmented binders can then be used to replace bituminous binders in all applications in which bituminous binders are used, for example road construction.

Among the various compositions covered by the term "synthetic binder" two families can be distinguished: binders of petrochemical origin and binders of vegetable origin.

The U.S. Pat. No. 5,021,476 describes a binder for producing an elastic pavement mass consisting of a mixture of tall oil rosin, wood resin and turpentine resin, a derivative of said resins or a mixture of said resins and a mineral or vegetable process oil. To confer elastic properties to these binders in order to obtain suitable resistance to cold, a polymer of petrochemical (elastomeric or/and thermoplastic) origin is added to the binder.

The patent FR 2,853,647 describes the composition of a binder of vegetable origin with viscoelasticity properties comparable to those of bitumen for a wide temperature range, from −20° C. to 70° C., enabling the manufacture of materials for the construction and/or public works industries. One such composition comprises:
- at least one natural or modified natural resin of vegetable origin having a measured softening point of 30° C. to 200° C. (ISO 4625),
- at least one vegetable oil having a viscosity at 25° C. of 50 mPa·s to 1,000 Pa·s.

Moreover, it is important to note that such a binder is completely free of any natural or synthetic elastomer or any other thermoplastic polymer.

The properties and proportions of the ingredients forming the synthetic binder are adjusted so as to obtain a binder that in the end has adhesive and mechanical properties similar to those of typical bituminous binders. In particular, the search is for binders whose properties best meet the specifications for road bitumens, such as described in the NF EN 12591 standard "Specifications for paving grade bitumens".

The patent FR 2,915,204 describes the composition of a vegetable binder essentially comprised of vegetable pitch, more particularly tall-oil pitch. Generally, one or more additives for adjusting physical or chemical characteristics are also part of such a composition. Said additives are in particular those for regulating viscosity, notably polymers, rosins or rosin derivatives as well as terpenes and terpene derivatives, etc.

The purpose of the present invention is to formulate a binder essentially made of material from renewable resources, in particular of vegetable origin, that provides rheological properties at least equivalent to a bituminous binder and to binders of vegetable origin described in the literature.

This formulation provides a synthetic binder essentially made of material from renewable resources, in particular of vegetable origin, having all the qualities required for use in road engineering, in particular mechanical and adhesive properties, but also satisfactory storage characteristics, improved resistance to aging and rheological properties making it possible to improve asphalt mix workability and by consequence to reduce the mixing temperatures of hot-mix asphalt. This reduction in temperature can be as great as 40° C.

To achieve such properties, it has proven necessary to resort to a polyester from renewable resources satisfying specific physicochemical properties. To be specific, the acid number and the hydroxyl number must be adjusted so as to obtain a binder of the invention with low sensitivity to water, in particular during application. Specifically, the iodine number must also be adjusted to suit the properties of the application.

The choice of viscosity is only a secondary characteristic insofar as it can be corrected during application by the optional inclusion of additives such as polymers.

The present invention relates to a synthetic binder comprising:
- 20% to 100% by weight of at least one polyester essentially made of material from renewable resources, in particular of vegetable origin, with
  - a hydroxyl number below 100 mg KOH/g,
  - an acid number below 25 mg KOH/g,
  - an iodine number below 100 g $I_2$/100 g,
  and,
- 0% to 80% by weight of at least one natural or modified resin from renewable resources, in particular of vegetable origin.

According to an advantageous embodiment of the invention, said synthetic binder comprises:
- 20% to 100% by weight of at least one polyester essentially made of material from renewable resources, in particular of vegetable origin, with
  - a hydroxyl number below 25 mg KOH/g,
  - an acid number below 5 mg KOH/g,
  - an iodine number below 40 g $I_2$/100 g,
  and,
- 0% to 80% by weight of at least one natural or modified resin from renewable resources, in particular of vegetable origin.

According to another embodiment of the invention, the vegetable polyester is obtained by polycondensation of a mixture of preferably saturated oils and/or fatty acids and polyacid with polyols.

According to another embodiment of the invention, the fatty acids or oils are from renewable resources of vegetable or animal origin, saturated or unsaturated.

The expression "oils from renewable resources" refers to crude or refined oils obtained by trituration of seeds, pits or fruits of plants, in particular of oleaginous plants, such as, in nonrestrictive manner, flax, rapeseed, sunflower, soya, olive, palm, castor, wood, corn, squash, grape seed, jojoba, sesame, walnut, hazelnut, almond, shea tree, macadamia, cotton, alfalfa, rye, safflower, peanut, copra, tall and argan oils, and/or obtained from animal fats, in particular tallow oil or fat. More particularly, the oils will be selected from of rapeseed, sunflower, soya, palm, copra and tall oils and tallow oil. The fatty acids are selected from:
- unsaturated conjugated fatty acids selected from linoleic acid; linolenic acid; fatty acids of sunflower, flax, soya or castor (dehydrated); tung, oiticica, soya, sunflower, safflower, olive, palm, flax and castor oils;
- unsaturated non-conjugated fatty acids, saturated fatty acids, fatty monoacids selected from fatty acids of castor, coconut, cotton, dehydrated castor, soya and tall; 2-ethyl hexanoic, linoleic, linolenic, oleic, palmitic, caprylic, capric, lauric, myristic, stearic, isostearic, arachidic, behenic and pelargonic acids; rosin; castor, coconut, cotton, dehydrated castor, soya and tall oils;
- non-fatty carboxylic monoacids, selected from benzoic, butanoic, p-tert-butyl benzoic, caproic, caprylic, capric, propanoic, pentanoic acid, abietic and crotonic acids.

According to another embodiment of the invention, the polyacids are selected from carboxylic polyacids or anhydrides of functionality at least equal to 2, in particular from citric, isophthalic and terephthalic acids; pyromellitic anhydride; and adipic, azelaic, fumaric, maleic, phthalic, succinic, sebacic, diglycolic, trimellitic, dimerized, trimerized and dodecanedioic acids or anhydrides.

According to another embodiment of the invention, said polyols are selected from polyols of functionality at least equal to 2, in particular from ethylene glycol, polyethylene glycol (molecular weight between 300 and 6,000), propylene glycol, 1,3-butylene diol, pentane diol, neopentyl glycol, hexane diol, diethylene glycol, dipropylene glycol, triethylene glycol, glycerol, trimethylolpropane, trimethylolethane, pentaerythritol, dipentaerythritol, sorbitol, methyl glucoside and trimethylolpropane.

As already mentioned above, any resins optionally present in the synthetic binder of the invention are also of renewable origin.

According to an advantageous embodiment of the invention, the natural resins are selected from crude or modified natural rosins, natural terpenes or modified natural terpenes.

According to another embodiment of the invention, the synthetic binder contains a colored pigment, preferably a light color (metallic oxides such as Ti, Zn or Fe oxides).

According to another embodiment of the invention, the synthetic binder further contains an agent that improves performance in terms of UV radiation.

According to an additional embodiment of the invention, the synthetic binder further contains structuring agents, reinforcements and/or rheology modifiers.

According to an advantageous embodiment of the invention, the synthetic binder is used in road engineering.

According to another embodiment of the invention, the synthetic binder is used to construct wearing courses of roadways, airfields and service stations and for coatings for pavements, parking facilities, esplanades and urban developments.

According to an advantageous embodiment of the invention, the synthetic binder is used in the form of an aqueous emulsion containing from 5% to 95% by weight of said synthetic binder.

The invention also relates to a surface dressing or cold-mix asphalt, prepared using a synthetic emulsion of binder.

In a surprising manner, the Applicants discovered that the specific vegetable polyester of the present invention, in mixture with structuring agents and/or reinforcements commonly used in the formulation of synthetic binders, produced a novel binder with controlled mechanical properties. Among said structuring agents, the present invention favors structuring agents of renewable origin such as natural resins or modified natural resins, preferably without the addition of petrochemical polymers. However, under certain conditions of use it may prove useful to add polymers to the binder of the invention, in particular polymers selected from styrene-butadiene copolymers, styrene-isoprene copolymers, ethylene-vinyl acetate (EVA) copolymers, terpolymers, such as for example the compound of an ethylene chain with butyl acrylate and glycidyl methacrylate functional groups. When such polymers are optionally added, they are present in a weight concentration below 10%, preferably below 5%.

With a view to these particular applications, the Applicants will favor saturated fatty acids, vegetable polyacids and vegetable polyols to make the polymer 100% renewable and to meet the requirements of the application in terms of:
  temperature stability:
    during binder storage: 80° C. to 160° C. and preferably 100° C. to 140° C.;
    on the roadway: −40° C. to 70° C. and preferably between 20° C. and 50° C.;
  UV stability;
  water stability.

To enter usefully into the formulation of the binder of the invention, the resin or resins defined above must have a softening point between 30° C. and 200° C., and preferably between 80° C. and 150° C.

More precisely, the Applicants discovered that a mixture containing from 20% to 100%, preferably from 20% to 80% and more preferably from 40% to 60% of vegetable polyester in a suitable resin, characterized by manufacturing tests and after stresses (temperature, moisture, UV):
  softening point (NF EN 1427);
  penetration at 25° C. (NF EN 1426);
  viscosity as a function of temperature; provided a binder of renewable origin with entirely satisfactory application properties.

The invention can be used advantageously in mixture with aggregates for any road engineering application, in particular for the construction of wearing courses of roadways or coatings for pavements, parking facilities, esplanades, etc.

As indicated above, a pigment can be added to the asphalt mix to change its color. The term "pigment" refers to any organic or mineral substance that gives color, as well as mixtures thereof in any proportions.

According to a preferred embodiment of the invention, the binder is used to construct a wearing course with improved visibility, for example for night driving or in tunnels.

According to a preferred embodiment of the invention, the binder is used to construct a wearing course of controlled color used, for example, to highlight a particular zone of the roadway (bus lane, bike lane, etc.) or to create contrasting esthetic effects in urban developments, squares, esplanade, etc.

According to a preferred embodiment of the invention, the synthetic binder is fuel-resistant by virtue of the use of oils from renewable resources, and is used in wearing courses for airfields or service stations or any parking or transit areas where fuel resistance improves the lifespan of the roadway.

The synthetic binder of the invention can also be emulsified using standard means used to emulsify bitumens, for example using a colloid mill, a static mixer or methods by phase inversion in a laminar system. Emulsification can be achieved using any emulsifier or mix of emulsifiers, selected for example from cationic, anionic, amphoteric or non-ionic emulsifiers.

According to a preferred embodiment of the invention, the emulsified synthetic binder is used in a wearing course such as surface dressing or cold-mix asphalt (cold micro asphalt concrete surfacing, i.e., microsurfacing).

According to a preferred embodiment of the invention, the emulsified synthetic binder is fuel-resistant, for example by virtue of the use of vegetable oil, and is used in wearing courses such as surface dressing or cold-mix asphalt (cold micro asphalt concrete surfacing, i.e., microsurfacing) for airfields or service stations or any parking or transit area where fuel resistance improves the lifespan of the roadway.

The synthetic binder of the invention can also be mixed with siccative vegetable flux to create a synthetic binder of vegetable origin for the formulation of surface dressing and cold-mix asphalt. An oxidation catalyst can be added for this application in order to promote the kinetics of the increase in cohesion of the synthetic binder. The term "oxidation catalyst" refers to any compound capable of accelerating the drying reaction of the siccative oil. Such compounds include, for example, metal salts, notably organic salts of cobalt, manganese and zirconium.

To prepare specific coatings (high-traffic areas, shear zones, etc.), from 0% to 3% by weight of reinforcements, for example polymers of vegetable or petroleum origin, could be added to the coating composition.

EXAMPLE 1

Manufacture and Analysis of Polymers of Vegetable Origin

Fabrication VP1:

Method for producing control vegetable polymer with unsatisfactory physicochemical properties: hydroxyl number 40-60 mg KOH/g; viscosity >25 dPa·s, acid number >5 mg KOH/g:

For 100 parts of vegetable polyester, mix 47 parts of palm oil, 0.05 part of lithium hydroxide and 6.5 to 7 parts of glycerol are mixed and heated at 200-220° C. for 1 hour. After the addition of 47 to 48 parts of dimerized fatty acids, the temperature is maintained at 220° C. Acid number and viscosity are measured every hour. Once the acid number reaches 20 mg KOH/g, pressure is gradually reduced to 100 mbar. The reaction then stagnates around 8-10 mg KOH/g and is stopped.

Results:
acid number: 7-12 mg KOH/g (ISO 660)
hydroxyl number: 40-60 mg KOH/g (ISO 4629)
iodine number: 55-70 g $I_2$/100 g (ISO 3961)
viscosity at 25° C.: 30-45 dPa·s
Gardner color: 8

Fabrication VP2:

Method for producing vegetable polymer with satisfactory physicochemical properties: hydroxyl number <25 mg KOH/g; acid number <5 my KOH/g, viscosity >25 dPa·s:

For 100 parts of vegetable polyester, 54 to 55 parts of stearic acid, 10.5 to 11 parts of glycerol and 39.5 parts of dimerized fatty acids are mixed. The mixture is then heated gradually to 190-220° C. promoting the elimination of water by-product. Acid number and viscosity are measured each hour. Once the acid number reaches 15 mg KOH/g, pressure is gradually reduced to 100 mbar. The reaction is then stopped when the acid number roaches 5 mg KOH/g.

Results:
acid number: 3-5 mg KOH/g (ISO 660)
hydroxyl number: 20-24 mg KOH/g (ISO 4629)
iodine number: 30-40 g $I_2$/100 g (ISO 3961)
viscosity at 25° C.: 30-50 dPa·s
Gardner color: 7

EXAMPLE 2

Manufacture and Analyses of Binders of the Invention

| Binder name | VB1 | VB2 |
| --- | --- | --- |
| Polymer of vegetable origin | | |
| Name | VP1 | VP2 |
| Content | 40 | 42 |
| Resin | | |
| Name | Dertopoline G* | |
| Manufacturer | DRT | DRT |
| Content | 60 | 58 |

*Low acid-number polymerized rosin esterified with glycerol

Mixing Conditions:

The vegetable polymer and the resin were mixed at 130° C. for 1 hour.

Binder Characteristics

| Test | Standard | Units | Binder name VB1 | VB2 | Bitumen grade 50/70 |
| --- | --- | --- | --- | --- | --- |
| Penetration | NF EN 1426 | 1/10 mm | 89 | 92 | 70 |
| Ring and ball softening point | NF EN 1427 | ° C. | 43.5 | 45.2 | 43.8 |
| Changes in properties after 14 days at 150° C.(1) | | | | | |
| Penetration | NF EN 1426 | 1/10 mm | 81 | 90 | 68 |
| Ring and ball softening point | NF EN 1427 | ° C. | 46.2 | 45.1 | 43.6 |
| Thin-film water stability of the binder(2) | | | | | |
| 3 days | | Appearance | of a white film* | transparent | — |
| 7 days | | | | transparent | — |

*Reflecting the binder's compatibility with water which can thus penetrate the binder too easily and negatively influence the application properties of said binder.
(1)1 kg of binder is placed in a closed, 2 kg-capacity metal pot for 14 days at 150° C.
(2)Binder is spread in a thin film in a cupel. After cooling, water is placed on the film of binder and the unit is placed in a 50° C. oven. At various times the technician notes the appearance of the binder surface.

EXAMPLE 3

Manufacture and Analyses of Asphalt Mix of the Invention 3-1 Asphalt mix based on sand-lime aggregates:

| | |
| --- | --- |
| 2/6 sand lime | 50% |
| 0/2 sand lime | 49% |
| Meac filler | 1% |
| Binder content | 6.3 ppc |

The aggregates are heated to 130° C. and mixed. Heated vegetable binder is added at 130° C. The asphalt mix is mixed for 3 minutes in a standard laboratory mixer.

| | Binder | VB1 | VB2 | Specifications |
| --- | --- | --- | --- | --- |
| Duriez test (NF 12697-12/procedure B | Cw (kPa) | 6020 | 7150 | |
| | Cd (kPa) | 8750 | 8900 | |
| | Cw/Cd | 69 | 80 | >70 |

3-2 Asphalt mix based on diorite aggregates:

| | |
|---|---|
| 6/10 diorite | 71% |
| 0/2 diorite | 26% |
| Meac filler | 3% |
| Binder content | 5.7 ppc |

| | Binder | VB1 | VB2 | Specifications |
|---|---|---|---|---|
| Duriez test (NF 12697-12/procedure B | Cw (kPa) | 6070 | 6820 | |
| | Cd (kPa) | 8200 | 8320 | |
| | Cw/Cd | 74 | 82 | >70 |

EXAMPLE 4

Evaluation of Performance after Aging

In order to evaluate changes in the performance of the binders of vegetable origin, tests of traction as a function of curing time at 50° C. were performed.

Traction rate is set at 2 mm/min.

Two asphalt mixes are thus compared. These two asphalt mixes differ in the binder used. The formula of the asphalt mix is as follows:

| | |
|---|---|
| 2/6 sand lime | 50% |
| 0/2 sand lime | 49% |
| Meac filler | 1% |
| Binding content | 6.3 ppc |

The binders used are:
binder of vegetable origin of the prior art: Dertoline MG (77%)+linseed oil (23%): (Binder of the prior art);
binder the invention.

FIG. 1 attached presents traction properties, measured at 25° C., after 56 days of curing at 50° C.

These results show the impact of the formulation of the vegetable binder on changes in the ductility properties of the asphalt mix over time.

The invention claimed is:

1. A process for making a wearing course, comprising applying to a surface a composition comprising a synthetic binder and an aggregate, wherein the synthetic binder comprises:
   20% to 100% by weight of at least one polyester essentially made of material from renewable resources,
   with
      a hydroxyl number below 25 mg KOH/g,
      an acid number below 5 mg KOH/g,
      an iodine number below 40 g $I_2$/100 g,
      and,
   0% to 80% by weight of at least one natural or modified resin from renewable resources.

2. A method according to claim 1, wherein said polyester is of vegetable origin.

3. A method according to claim 1, wherein said natural or modified resin from renewable resources is of vegetable origin.

4. A method according to claim 1, wherein said vegetable polyester has a viscosity at 25° C. above 25 dPa·s.

5. A method according to claim 1, wherein said binder comprises:
   40% to 60% by weight of at least one vegetable polyester, and
   60% to 40% by weight of at least one natural or modified resin from renewable resources.

6. A method according to claim 5, wherein said natural or modified resin from renewable resources if of vegetable origin.

7. A method according to claim 1, wherein the vegetable polyester is obtained by polycondensation of a mixture of fatty acids.

8. A method according to claim 7, wherein said mixture of fatty acids is a mixture of saturated fatty acids and polyacids with polyols.

9. A method according to claim 7, wherein the fatty acids come from animal or vegetable oils, or both.

10. A method according to claim 9, wherein said oils are from renewable resources of vegetable or animal origin, saturated or unsaturated.

11. A method according to claim 10, wherein said oils are from renewable resources of vegetable is obtained by trituration of seeds, pits or fruits of plants.

12. A method according to claim 11, wherein said plants are oleaginous plants.

13. A method according to claim 12, wherein said oleaginous plants are selected from the group consisting of flax, rapeseed, sunflower, soya, olive, palm, castor, wood, corn, squash, grape seed, jojoba, sesame, walnut, hazelnut, almond, shea tree, macadamia, cotton, alfalfa, rye, safflower, peanut, copra, tall and argan oils.

14. A method according to claim 10, wherein said oils of animal origin are from animal fats selected from tallow fats.

15. A method according to claim 7, wherein the fatty acids are selected from the group consisting of:
   unsaturated conjugated fatty acids selected from the group consisting of linoleic acid; linolenic acid; fatty acids of sunflower, flax, soya or castor (dehydrated); tung, oiticica, soya, sunflower, safflower, olive, palm, flax and castor oils;
   unsaturated non-conjugated fatty acids, saturated fatty acids, fatty monoacids selected from the group consisting of fatty acids of castor, coconut, cotton, dehydrated castor, soya and tall; 2-ethyl hexanoic, linoleic, linolenic, oleic, palmitic, caprylic, capric, lauric, myristic, stearic, isostearic, arachidic, behenic and pelargonic acids; rosin; castor, coconut, cotton, dehydrated castor, soya and tall oils;
   non-fatty carboxylic monoacids, selected from the group consisting of benzoic, butanoic, p-tert-butyl benzoic, caproic, caprylic, capric, propanoic, pentanoic acid, abietic and crotonic acids.

16. A method according to claim 9, wherein the fatty acids come from tallow or oleaginous plants, or both.

17. A method according to claim 16, wherein said oleaginous plants are selected from the group consisting of rapeseed, sunflower, soya, palm and tall oils.

18. A method according to claim 8, wherein the polyacids are selected from carboxylic polyacids or anhydrides of functionality at least equal to 2.

19. A method according to claim 18, wherein said carboxylic polyacids or anhydrides of functionality at least equal to 2 are selected from the group consisting of citric, isophthalic and terephthalic acids; pyromellitic anhydride; and adipic, azelaic, fumaric, maleic, phthalic, succinic, sebacic, diglycolic, trimellitic, dimerized, trimerized and dodecanedioic acids or anhydrides.

20. A method according to claim 7, wherein said polyols are selected from polyols of functionality at least equal to 2.

21. A method according to claim 20, wherein said polyols of functionality at least equal to 2 are selected from the group consisting of ethylene glycol, polyethylene glycol (molecular weight between 300 and 6,000), propylene glycol, 1,3-butylene diol, pentane diol, neopentyl glycol, hexane diol, diethylene glycol, dipropylene glycol, triethylene glycol, glycerol, trimethylolpropane, trimethylolethane, pentaerythritol, dipentaerythritol, sorbitol, methyl glucoside and trimethylolpropane.

22. A method according to claim 1, wherein the natural resin has a softening point between 30° C. and 200° C.

23. A method according to claim 22, wherein said softening point is between 80° C. and 150° C.

24. A method according to claim 1, wherein the natural resins are selected from crude natural rosins or modified natural rosins, natural terpenes or modified natural terpenes.

25. A method according to claim 1, wherein said binder contains a colored pigment.

26. A method according to claim 25, wherein said colored pigment is metallic oxides.

27. A method according to claim 26, wherein said metallic oxides are selected from the group comprising oxides of Ti, Zn or Fe.

28. A method according to claim 1, wherein said binder further contains an agent that improves performance in terms of UV radiation.

29. A method according to claim 1, wherein said binder further contains additives selected from the group consisting of structuring agents, reinforcements and/or rheology modifiers.

30. A method according to claim 29, wherein said binder further contains up to 10% by weight of a polymer selected from styrene-butadiene copolymers, styrene-isoprene copolymers, ethylene-vinyl acetate (EVA) copolymers, terpolymers.

31. A method according to claim 30, wherein said binder further contains up to 5% by weight of the said polymer.

32. A method according to claim 30, wherein said terpolymer is the compound of an ethylene chain with butyl acrylate and glycidyl methacrylate functional groups.

33. A method according to claim 1, wherein the surface is a wearing course of a roadway, airfield, or service station, or the surface is a pavement, parking facility, esplanade, or urban development.

34. A method according to claim 1, wherein the composition is in the form of an aqueous emulsion containing from 5% to 95% by weight of the synthetic binder.

35. A method according to claim 33, wherein the wearing course is a surface dressing or microsurfacing.

36. A surface dressing or microsurfacing manufactured using an aqueous emulsion containing from 5% to 95% by weight of the synthetic binder disclosed in claim 1.

* * * * *